(12) United States Patent
Trantham et al.

(10) Patent No.: US 8,479,032 B2
(45) Date of Patent: Jul. 2, 2013

(54) SYSTEMS, METHODS AND DEVICES FOR REGULATION OR ISOLATION OF BACKUP POWER IN MEMORY DEVICES

(75) Inventors: Jon David Trantham, Chanhassen, MN (US); Darren Edward Johnston, Burnsville, MN (US); Dean Clark Wilson, Lonsdale, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 1025 days.

(21) Appl. No.: 12/492,935

(22) Filed: Jun. 26, 2009

(65) Prior Publication Data

US 2010/0332858 A1    Dec. 30, 2010

(51) Int. Cl.
*G06F 1/30* (2006.01)
*G06F 1/16* (2006.01)
*G06F 13/00* (2006.01)

(52) U.S. Cl.
USPC .......................... 713/340; 713/300; 711/100

(58) Field of Classification Search
USPC ................. 713/300–340; 711/100, 102–106
See application file for complete search history.

(56) References Cited

U.S. PATENT DOCUMENTS

| | | | |
|---|---|---|---|
| 4,510,400 A | 4/1985 | Kiteley | |
| 5,367,489 A | 11/1994 | Park et al. | |
| 5,459,850 A | 10/1995 | Clay et al. | |
| 5,483,486 A | 1/1996 | Javanifard et al. | |
| 5,497,119 A | 3/1996 | Tedrow et al. | |
| 5,537,360 A | 7/1996 | Jones et al. | |
| 5,546,042 A | 8/1996 | Tedrow et al. | |
| 5,567,993 A | 10/1996 | Jones et al. | |
| 5,592,420 A | 1/1997 | Cernea et al. | |
| 5,914,542 A | 6/1999 | Weimer et al. | |
| 5,959,926 A | 9/1999 | Jones et al. | |
| 6,091,617 A | 7/2000 | Moran | |
| 6,404,647 B1 | 6/2002 | Minne' | |
| 6,567,261 B2 | 5/2003 | Kanouda et al. | |
| 6,700,352 B1 | 3/2004 | Elliott et al. | |
| 6,788,027 B2 | 9/2004 | Malik | |
| 6,838,923 B2 | 1/2005 | Pearson | |
| 6,862,651 B2 * | 3/2005 | Beckert et al. | 711/103 |
| 6,957,355 B2 * | 10/2005 | Acton et al. | 713/340 |
| 6,981,161 B2 | 12/2005 | Koo | |
| 7,019,583 B2 | 3/2006 | Del Signore, II et al. | |
| 7,173,821 B2 | 2/2007 | Coglitore | |
| 7,177,222 B2 | 2/2007 | Spengler | |

(Continued)

OTHER PUBLICATIONS

N. Li, J. Zhang, and Y. Zhong, "A Novel Charging Control Scheme for Super Capacitor Energy Storage in Photovoltaic Generation System," DRPT2008 6-9 Apr. 2008 Nanjing China.

(Continued)

*Primary Examiner* — Tim T Vo
*Assistant Examiner* — Trisha Vu

(57) ABSTRACT

Power-backup capabilities are provided by implementing a variety of different methods, systems and devices. According to one such implementation, a data-storage device is implemented having a memory control circuit controlling nonvolatile and volatile memory. An operating power circuit carries primary-operating power from the host-system to the memories and control circuitry. A backup power circuit includes energy-storage circuitry with one or more energy storage devices. An isolation-regulation circuit provides voltage regulation of power from the host-system and also isolates the host-system provided power from the energy storage devices. A regulation power circuit carries the regulated power from the isolation-regulation circuit to the energy storage devices.

18 Claims, 4 Drawing Sheets

U.S. PATENT DOCUMENTS

| | | | |
|---|---|---|---|
| 7,233,890 B2 | 6/2007 | Shapiro et al. | |
| 7,268,998 B2 | 9/2007 | Ewing et al. | |
| 7,269,755 B2 | 9/2007 | Moshayedi et al. | |
| 7,305,572 B1 | 12/2007 | Burroughs et al. | |
| 7,310,707 B2 | 12/2007 | Olds et al. | |
| 7,318,121 B2 | 1/2008 | Gaertner et al. | |
| 7,321,521 B2 | 1/2008 | Spengler | |
| 7,334,144 B1 | 2/2008 | Schlumberger | |
| 7,404,073 B2 | 7/2008 | Felts | |
| 7,404,131 B2 | 7/2008 | McCarthy et al. | |
| 7,414,335 B2 | 8/2008 | Hussein et al. | |
| 7,484,109 B2* | 1/2009 | Feldman et al. | 713/300 |
| 7,487,391 B2 | 2/2009 | Pecone et al. | |
| 7,802,121 B1* | 9/2010 | Zansky et al. | 713/340 |
| 2006/0080515 A1 | 4/2006 | Spiers et al. | |
| 2006/0136765 A1* | 6/2006 | Poisner et al. | 713/323 |
| 2006/0212644 A1* | 9/2006 | Acton et al. | 711/103 |
| 2007/0223870 A1 | 9/2007 | Farling et al. | |
| 2008/0007219 A1 | 1/2008 | Williams | |
| 2008/0189484 A1* | 8/2008 | Iida et al. | 711/114 |
| 2008/0232144 A1 | 9/2008 | Klein | |
| 2009/0006877 A1 | 1/2009 | Lubbers et al. | |
| 2010/0205470 A1* | 8/2010 | Moshayedi et al. | 713/340 |

OTHER PUBLICATIONS

ECNmag.com, "1.2A, 1.6MHz Synchronous Boost Regulator from Linear Technology," Top News, Jan. 8, 2009.

Intel® Mainstream SATA Solid State Drives, "Intel® X25-M and X18-M Mainstream SATA Solid-State Drives".

"Get the Lowdown on Ultracapacitors," Penton Media, Inc., Nov. 15, 2007.

STMicroelectronics, "Regulating Pulse Width Modulators, SG3524," Jul. 2000.

Linear Technology, "1.2A Synchronous Step-up DC/DC Converter with Input Current Limit, LTC3125," 2008.

* cited by examiner

SYSTEMS, METHODS AND DEVICES FOR REGULATION OR ISOLATION OF BACKUP POWER IN MEMORY DEVICES

FIELD OF THE INVENTION

Aspects of the present invention relate to power control features, such as power regulation or power isolation, which can be particularly useful for memory and data storage applications in which data integrity upon a power loss is an issue.

BACKGROUND

Computer systems generally have several levels of memory; each level of memory can provide differing levels of speed, memory capacity, physical size, power requirements, voltage levels and/or volatility. These aspects are often at odds with each other. For example, increases in speed often lead to corresponding increases in power requirements. For this reason, many systems use a variety of different memories within the same system. From the perspective of a processor executing a computer program, these memories are often hidden in the sense that common data is temporarily cached in smaller and faster memory circuits. This common data is mapped to larger and slower memory circuits, which are accessed when the faster memory does not contain the desired data. The common data, if changed in the cached memory, can eventually be written to the larger and slower memory circuits. This allows for the access time of slow memory circuits to be hidden so long as the faster memory circuits contain the appropriately mapped data.

Computer systems generally contain some type of data storage device for providing mass-storage memory that is able to retain stored data when the computer system is powered down. This type of memory is referred to as nonvolatile memory because it is able to maintain data integrity in the absence of electrical power. Nonvolatile memory, however, can be slower by orders of magnitude relative to various volatile memories. Yet, nonvolatile memory can also be less expensive (per unit of memory capacity) and/or less power hungry. A common type of nonvolatile data-storage device is a hard disc drive (HDD) that uses a rotating magnetic storage media. HDDs are used for home-computers, servers, workstations, consumer-electronics and various other devices. Under normal operation, a computer system transfers data requiring nonvolatile retention from temporary memory to a HDD before the computer system is powered down. This allows for the data to be retained after the power is removed from the computer system. When the computer system is subsequently powered up, this data can be accessed and used by the computer system.

HDDs with rotating magnetic media have been in use for many years and have undergone various improvements including efficiency, reliability and data storage capacity. Various applications, however, are beginning to use other types of nonvolatile memory with more frequency. Solid State Drives/Devices (SSDs), using electronic nonvolatile memory (e.g., flash), are one such type of device, and are attractive for many applications. Speed, cost and power requirements factor into the selection of data storage devices such as SSDs or HDDs.

SSDs are attractive for many applications including those more traditionally associated with HDDs. HDDs use moving parts to access the storage medium. Thus, they often have slow data access time and lower power consumption compared to SSDs. One type of SSD uses nonvolatile NAND flash memory to store data. Flash memory is also used for handheld devices for which space and/or power requirements are at a premium. Generally, SSDs are not as susceptible to issues relating to physical shock and vibration. In an HDD, such movements can degrade performance by interrupting accesses to the rotating media. Thus, HDDs often include various mechanisms to compensate for mechanical shocks. Speed, cost and power requirements also factor into the selection of SSDs or HDDs.

While SSDs exhibit various desirable characteristics as relative, for example, to HDDs, the implementation of SSDs remains challenging and in many cases SSDs have not yet replaced HDDs. For example, NAND flash chips contain storage cells that wear out as the cells are erased and reprogrammed (written). This leads to the desire to minimize the number of erase and write cycles within the flash devices. Conventional NAND flash chips typically erase data in blocks and program data in pages, where a block is larger than a page. For example, a page might be 4K bytes, while an erase block might be 256K bytes. Packets of data received from a host into a data storage device are typically received as one or more logical blocks. 512-byte logical blocks are a popular size. Since the NAND flash chips used in some SSDs may contain erase and page block sizes that do not match the sizes of data being written by the host system, it is often desirable to temporarily contain the data for write commands in volatile memory (cache it) until additional write data is received. Frequently, this will be done until the sum of the total data to be written equals or surpasses the size of a page or an erase block. In this manner, multiple host writes are coalesced into a single page write operation.

Retaining unwritten data in volatile memory can be hazardous to data integrity under power failure conditions. Backup power supplies are frequently used to protect against loss of power, allowing the device to store unwritten data in nonvolatile memory in the event of power loss. Unfortunately, the power-delivering capabilities of various backup power supplies can degrade over time. If the backup power supply degrades significantly, it may become insufficient to ensure that all pertinent data is written from the volatile memory circuit during a power-loss event.

Aspects of the present invention, although not limited thereto, can be appreciated in the context of such data storage devices providing mass-memory.

SUMMARY

The present invention is directed to systems and methods for use with power control features relating to a variety of memory applications, including those susceptible to power failure as described above. These and other aspects of the present invention are exemplified in a number of illustrated implementations and applications, some of which are shown in the figures and characterized in the claims section that follows.

According to one embodiment of the present invention, a data storage device is implemented having a memory control circuit. A nonvolatile solid-state memory circuit provides data storage under control of the memory control circuit. A volatile memory circuit, caches various data under control of the memory control circuit. The memory is referred to as volatile in that data loss occurs when the primary-operating in voltage, used to provide power to the memory, drops below a voltage threshold level. An operating power circuit provides operating power to the memories and the control circuit. During normal device operation, the operating power circuit receives its power from a host-system power source. When system power is lost, the operating power circuit receives its power from a backup power circuit. The backup power circuit includes an energy-storage circuit, also referred to as a power-reservoir circuit, with a capacitor acting as an energy-storage device. The capacitor is designed to hold sufficient energy to provide substantially all of the primary-operating power to the memory circuits during a minimum time period sufficient to permit transfer of pertinent data from the volatile memory circuit to the nonvolatile memory circuit. An isolation-regulation circuit provides for voltage regulation of power from the host-system power source to the back-up power circuit and for isolating the host-system power from the back-up power circuit when the voltage from the host-system power source drops below a voltage threshold level.

According to another embodiment of the present invention, a data storage device includes a hard-disc housing structure that contains various circuits including a memory control circuit. A nonvolatile solid-state memory circuit provides data storage under control of the memory control circuit. A volatile memory circuit, caches various data under control of the memory control circuit. The memory is referred to as volatile in that data loss occurs when the operating voltage drops below a voltage threshold level. An operating power circuit provides operating power to the memories and the control circuit. During normal device operation, the operating power circuit receives its power from a host-system power source. When system power is lost, the operating power circuit receives its power from a backup power circuit. The backup power circuit includes an energy-storage circuit, also referred to as a power-reservoir circuit, with a capacitor acting as an energy-storage device. The capacitor is designed to hold sufficient energy to provide substantially all of the primary-operating power to the memory circuits during a minimum time period sufficient to permit transfer of pertinent data from the volatile memory circuit to the nonvolatile memory circuit. An isolation-regulation circuit provides for voltage regulation of power from the host-system power source to the back-up power circuit and for isolating the host-system power from the back-up power circuit when the voltage from the host-system power source drops below a voltage threshold level.

Consistent with an embodiment of the present invention, a method is implemented. The method includes a step of providing access to data stored within a solid-state memory circuit under control of a memory control circuit. Data is cached within a volatile memory circuit to facilitate the operation of the data storage device. Power is delivered from a host-system power supply to the volatile memory circuit for use as primary-operating power. An amount of energy is stored in one or more energy-storage components within an energy-storage circuit. The amount of energy is sufficient to provide substantially all of the primary-operating power to the volatile memory circuit during a minimum time period sufficient to permit transfer of at least the cached data from the volatile memory circuit to the nonvolatile memory circuit. Power from the host-system power source is regulating, using an isolation-regulation circuit. The energy-storage component is charged using the regulated power from the isolation-regulation circuit. The power from the host-system power source is isolated relative to the energy-storage circuitry in response to the host-system provided power dropping below a voltage threshold level.

According to one embodiment of the present invention, a data-storage device includes a memory control circuit. A solid-state nonvolatile memory circuit provides for, under control of the memory control circuit, storage of data. A volatile memory circuit is powered by a primary-operating power and stores, under control of the memory control circuit, write data destined for the solid-state nonvolatile memory circuit. Power circuitry receives electrical power from an external host-system power source and provides the received electrical power for use as the primary-operating power. A backup power circuit includes an energy-storage circuit with one or more energy storage components designed to hold sufficient energy to provide substantially all of the primary-operating power during a minimum time period sufficient to permit transfer, of at least the write data, from the volatile memory circuit to the nonvolatile memory circuit. The backup power circuit also includes an isolation-regulation circuit for providing voltage regulation of the electrical power received from the host-system power source, for providing the regulated voltage for charging of the energy storage circuit, and for isolating the received host-system power source from the energy storage components in response to the power received from host-system power source dropping below a voltage threshold level.

Other embodiments are directed to methods, memory devices, control circuits and other related arrangements that operate in accordance with the above-discussed and other embodiments described herein.

The above summary is not intended to describe each illustrated embodiment or every implementation of the present invention. The figures and detailed description that follow, including that described in the appended claims, further exemplify embodiments of the present invention.

BRIEF DESCRIPTION OF THE DRAWINGS

The invention may be more completely understood in consideration of the detailed description of various embodiments of the invention in connection with the accompanying drawings as follows.

Figure 1A:
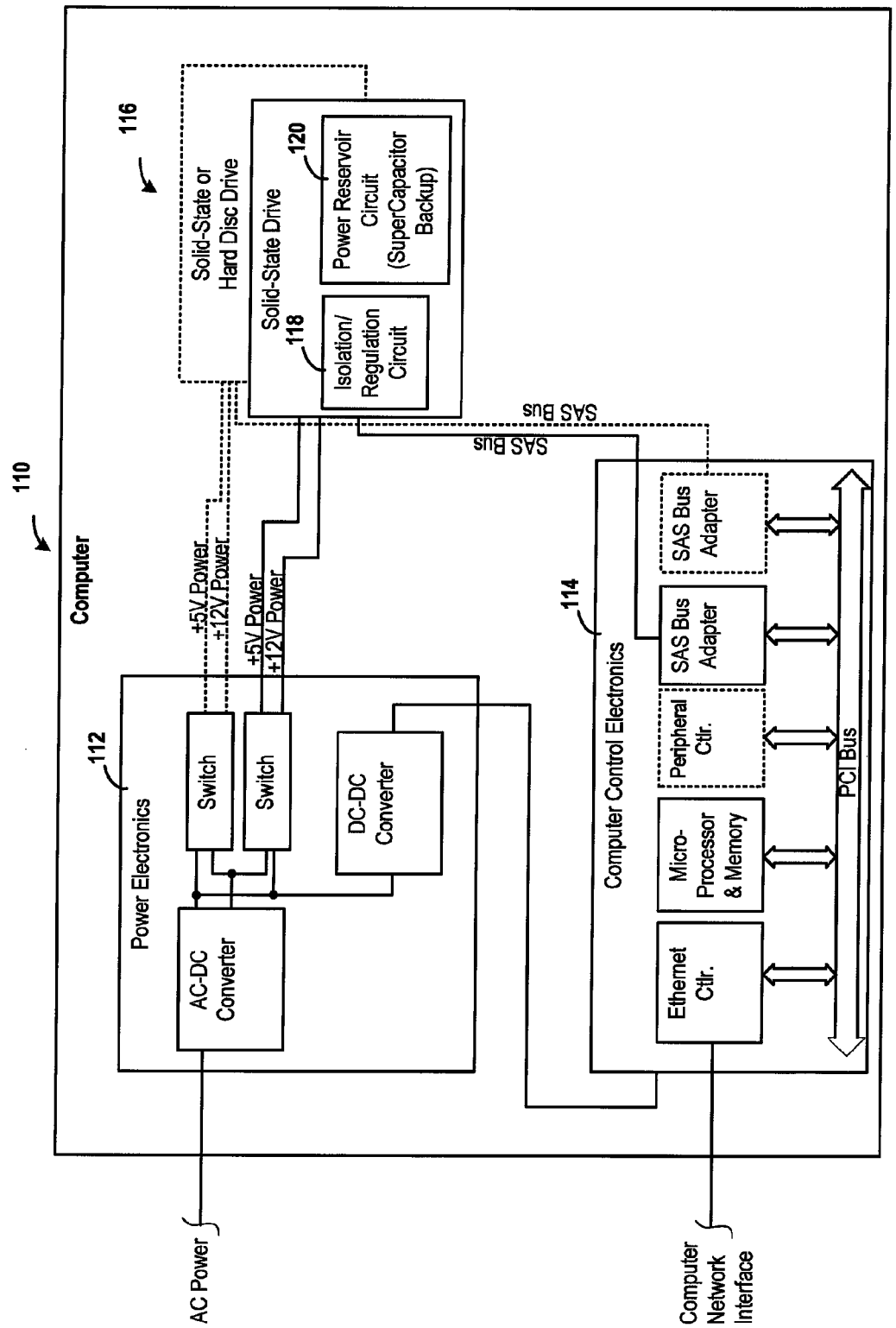
FIG. 1A shows a computer system having one or more solid state drives that have regulated backup power to operate memory backup functions in response to a power interruption, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present invention are believed to be useful for regulating, isolating, and/or extending the useful product lifetime of backup power sources. Aspects of the present invention are especially appreciated in data storage devices, circuits and systems. A particular application of the present invention relates to circuits and methods for providing backup power regulation and/or isolation for memory and data storage devices, such as solid state devices (SSDs) that provide nonvolatile-type data storage. While the present invention is not necessarily limited to such applications, various aspects of the invention may be appreciated through a discussion of various examples using this context.

In connection with an embodiment of the present invention, a data storage device includes a memory control circuit. A nonvolatile solid-state memory circuit provides nonvolatile data storage under the control of the memory control circuit. A volatile memory circuit, caches various data under the control of the memory control circuit. The memory is referred to as volatile in that data loss can occur in the memory circuit when its supplied voltage drops below a voltage threshold level. An operating power circuit carries regulated operating power to the memories and the control circuit. A backup power circuit includes an energy-storage circuit, also known as a power-reservoir circuit, with a capacitor acting as an energy-storage device. The circuit is designed to hold sufficient energy to provide substantially all of the operating power to the memory circuits during a minimum time period sufficient to permit transfer of pertinent data from the volatile memory circuit to the nonvolatile memory circuit on loss of power from the host system. Pertinent data includes data necessary to maintain the data integrity of the data storage device while it is de-energized. An example of pertinent data is dirty data within the volatile memory. Dirty data is data in the volatile memory that is no longer guaranteed to be coherent with the nonvolatile memory. Dirty data can include write data that is destined for the solid-state memory or firmware metadata that has not been written to the nonvolatile memory. An isolation-regulation circuit provides voltage regulation of power from the host-system provided power and for isolating from the host-system provided power from the capacitor when the power from the host-system provided power drops below the voltage threshold level. A regulation power circuit carries the regulated power from the isolation-regulation circuit to and from the capacitor in the energy-storage circuit.

According to an embodiment of the present invention, the data storage device is configured to function as a long-term mass-storage device within a computer system. The memory device includes nonvolatile memory that is designed to maintain data integrity in the absence of primary-operating power. The primary-operating power is typically implemented as one or more voltage rails that provide relatively constant voltages used to power data storage devices. In a particular implementation, the primary-operating power is provided from a host system, such as a processor circuit.

A volatile memory is also included in the device, typically serving as temporary storage for cached data and firmware data structures. Data stored in the volatile memory are susceptible to loss when the primary-operating power voltage falls below a threshold. The storage device is therefore configured to detect a host-power loss event and to flush all pertinent data from the volatile to the nonvolatile memory for storage. This flush of data requires a minimum time period during which sufficient power and voltage needs to be available to the memories. Additionally, any ongoing nonvolatile memory erase and programming operations in progress at the time of power loss also require applied power for the time for completion. The power-reservoir circuit is therefore designed according to these time and power parameters. Aspects of the present invention use a voltage regulation and isolation circuit to further condition power received from the host system. A power-providing circuit carries this conditioned power to the capacitor to charge the capacitor to a voltage level that is substantially independent from the host-system provided power. Substantial independence means that output (conditioned power) voltage can be set to a desired level so long as the input (host-provided power source) voltage stays within an acceptable voltage range. It is, however, understood that transient input voltage changes will likely cause corresponding transient output voltage changes because it is virtually impossible to filter all transient voltage changes in the power from the host system. Thus, substantial independence does not preclude an acceptable level of transient voltage dependence between inputs and outputs of the circuit.

In one implementation of the present invention, the isolation-regulation circuit provides conditioning that narrows the voltage range of the conditioned power. Host-system provided power sources for data storage devices are often designed to conform to an appropriate standard. For example, Fibre-Channel-Arbitrated-Loop (FCAL) type-drives may comply with the Small Form-Factor Committee's SFF-8045 specification standard. Other common data-storage interfaces, for example, Serial Advanced Technology Attachment (SATA), Serial Attached SCSI (SAS), Advanced Technology Attachment (ATA), IEEE-1394, Universal Serial Bus (USB) or parallel Small Computer System Interface (SCSI) typically also have power standards either in the interface specification or in corresponding power standards. The power requirements of these and other standards allow for significant variation from the power source. For example, the permissible applied voltage operating ranges, according to a particular standard, may be ±10% of a nominal voltage level.

Energy stored by an ideal capacitor is defined as $E=\frac{1}{2}CV^2$, where C is the capacitance and V is the voltage stored on the capacitor. Thus, the amount of energy stored can vary greatly depending upon the voltage level stored on the capacitor. The isolation-regulation circuit conditions power from the host-system power source so that the output range of the conditioned power is significantly smaller than that of the host-system provided power. This can be particularly useful for reducing the cost of the power-reservoir circuit. It is counter-intuitive that additional isolation/regulation circuitry can be helpful in reducing the cost associated with the power-reservoir circuit. Notwithstanding, aspects of the present invention recognize that more precise control over the voltage seen on the capacitor allows for more precise selection of the capacitive values. Thus, the additional circuitry allows for more efficient use of capacitors, which often represent a significant cost of the memory device.

Supercapacitors, also known as double-layer capacitors, are a particular example of a capacitor used within SSD backup power supplies. The energy-storage and power-delivery capabilities of supercapacitors usually degrade as the devices age. Applied voltage and environmental temperature conditions upon these capacitors can affect their aging and useful lifetime.

In a particular embodiment of the present invention, the isolation-regulation circuit functions as a boost regulator that raises an input voltage to a higher output voltage. For instance, the primary power source may vary between 4.5 V and 5.5 V. The isolation-regulation circuit raises the voltage to a desired voltage level, such as 5.0 V or 7 V. Thus, the capacitive value is no longer required to conform to the lowest voltage (in this case 4.5 V) for the primary power source thereby allowing use of smaller and presumably cheaper capacitors.

According to another embodiment of the present invention, the isolation regulation circuit provides protection from voltages exceeding a voltage threshold. Supercapacitor life-expectancy is dependent upon the voltage applied to the capacitor. Higher voltages tend to reduce the life-expectancy. Thus, the isolation regulation circuit protects the supercapacitor from high voltages, thereby typically increasing its life-expectancy. Alternately, a supercapacitor with a lower voltage rating may be used, thereby typically reducing its cost and size.

In another embodiment of the present invention, the isolation-regulation circuit functions as a buck-boost regulator that converts a relatively wide range of input voltages to a desired output voltage with a narrower range. The buck-boost regulator can be designed with a much tighter regulated voltage output range compared to a storage device power specification. For instance, per the storage device's standard specification of 5 V±10%, the host-system provided power may vary between 4.5 V and 5.5 V. The isolation-regulation converts the applied voltage to a desired voltage level. For instance, the regulator has a regulated output of 5.0 V±2% and thus outputs between 4.9 V and 5.1 V. Thus, the capacitive value is no longer required to conform to accommodate the lowest voltage for the host-system power source, nor is it required to conform to the rated voltage level of the capacitor to accommodate the highest voltage for the host-system power source, thereby allowing use of smaller and presumably cheaper capacitors (e.g., due to lower capacitive values and/or lower voltage ratings being acceptable).

According to other embodiments of the present invention, the isolation regulation circuit provides power from the host-system provided power source during a power failure event. During a power failure event, the power from the host-system provided power source degrades (e.g., the voltage drops toward zero) over a period of time. The rate of degradation depends upon the cause of the failure as well as the load on the host-system provided power source. The isolation regulation circuit serves to harvest power from the host-system provided power source when the voltage level drops below the charge stored on the capacitor and/or below an acceptable voltage. The capacitive value of the power-reservoir circuit can be designed under the assumption that a minimum amount of energy or instantaneous power can be harvested during a power failure event. This can be particularly useful for reducing the size of the capacitor and/or reducing the cost of the circuit.

For specific embodiments of the present invention, the various circuit components, including the power-reservoir circuit and supercapacitor(s), are implemented within standard hard drive form factors. The restrictions on height, width, length and connection types (both physical and electrical connections) limit the component selection. In particular, the capacitive storage needs to fit within the desired form factors, while having sufficient capacitive storage ratings to provide the necessary backup functionality. Four possible, non-limiting, form factors are 5.25 inch (half height): 5.75 in×1.63 in×8 in (146.1 mm×41.4 mm×203 mm), 3.5 inch (low height): 4 in×1 in×5.75 in (101.6 mm×25.4 mm×146 mm), 2.5 inch (small form factor): 0.59 in×2.8 in×3.9 in (15 mm×70 mm×100 mm) and 2.5 inch (low-profile small form factor): 0.28 in×2.8 in×3.9 in (7 mm×70 mm×100 mm).

According to embodiments of the present invention, the isolation-regulation circuit provides dedicated power to the power-reservoir circuit. The power-reservoir circuit can thereby be substantially isolated from the other circuit components of the memory device until a power-loss event occurs.

According to other embodiments of the present invention, the isolation-regulation circuit can provide power to various other circuit components in addition to the power-reservoir circuit.

Consistent with embodiments of the present invention, a data storage device includes a test circuit for assessing the power-providing capabilities of a power-reservoir circuit. In a particular implementation, the test circuit performs a test discharge of one or more capacitors that form part of the power-reservoir circuit. The results of the test indicate the energy-storage and power-providing capabilities of the power-reservoir circuit. From this determination, a control signal is generated. This control signal is provided to an isolation regulation circuit, which uses the control signal to determine the voltage level for charging the one or more capacitors.

Turning now to the figures, FIG. 1A shows a computer 110 that includes a solid-state drive 116 with the capability of providing backup power in response to a power interruption, according to another example embodiment of the present invention. Computer control electronics 114 control the flow of data between the processing elements of the computer, memory storage elements (e.g., solid-state/hard drives 116) and various computer interfaces (e.g., network interfaces or display devices). The computer 110 includes power electronics 112 that receive power from an external source, which can include alternating current (AC) sources. The power electronics 112 generate one or more direct current (DC) voltages and provide the generated DC voltages to the necessary computer components, including solid-state drive 116.

Solid-state drive 116 includes a power-reservoir circuit 120 for providing operating power for the solid-state drive in the event of a power loss. In a specific implementation, the power-reservoir circuit 120 includes one or more supercapacitors for storing backup power that is used during a power-loss event. Solid-state drive 116 also includes a regulation isolation circuit 120 for regulating and/or isolating the DC voltages of the power electronics 112 relative to the power-reservoir circuit 120.

In a particular implementation, the output of the isolation circuit 118 is not connected to the operating power of the memory device during normal operation. When a power-loss event is detected, however, the circuitry switches so that the power-reservoir circuit is then connected and used to power the memory device during backup data transfers. The connection can be implemented using suitable switching circuits, such as field-effect transistors (FETs).

In an alternative implementation, the output of the isolation/regulation circuit 118 is always connected to the operating power of the memory device during normal operation. When a host power-loss event is detected, the isolation/regulation circuit then isolates the power-reservoir circuit from the host-power and provides power to the memories and controllers from the power-reservoir circuit.

In one embodiment of the present invention, the solid-state drive 116 is implemented within a traditional hard drive form factor. The electrical interface between the drive 116 and the computer is shown as a SAS interface, but is not limited to any specific hard drive specification or interface.

According to an alternative embodiment of the present invention, the solid-state drive 116 is implemented according to a non-traditional form factor. In particular, solid-state drives do not contain mechanical disks and motors associated with traditional magnetic disk drives. This allows for more freedom in the design and placement of the various circuits, such as the memory controller circuit, the nonvolatile memory circuit, the power-reservoir circuit and the supercapacitor(s). In a specific implementation, the power-reservoir circuit 120 and associated isolation regulation circuit 118 can be placed on a different circuit board. This can be useful for allowing shared use of the circuits between multiple solid-state devices.

Figure 1B:
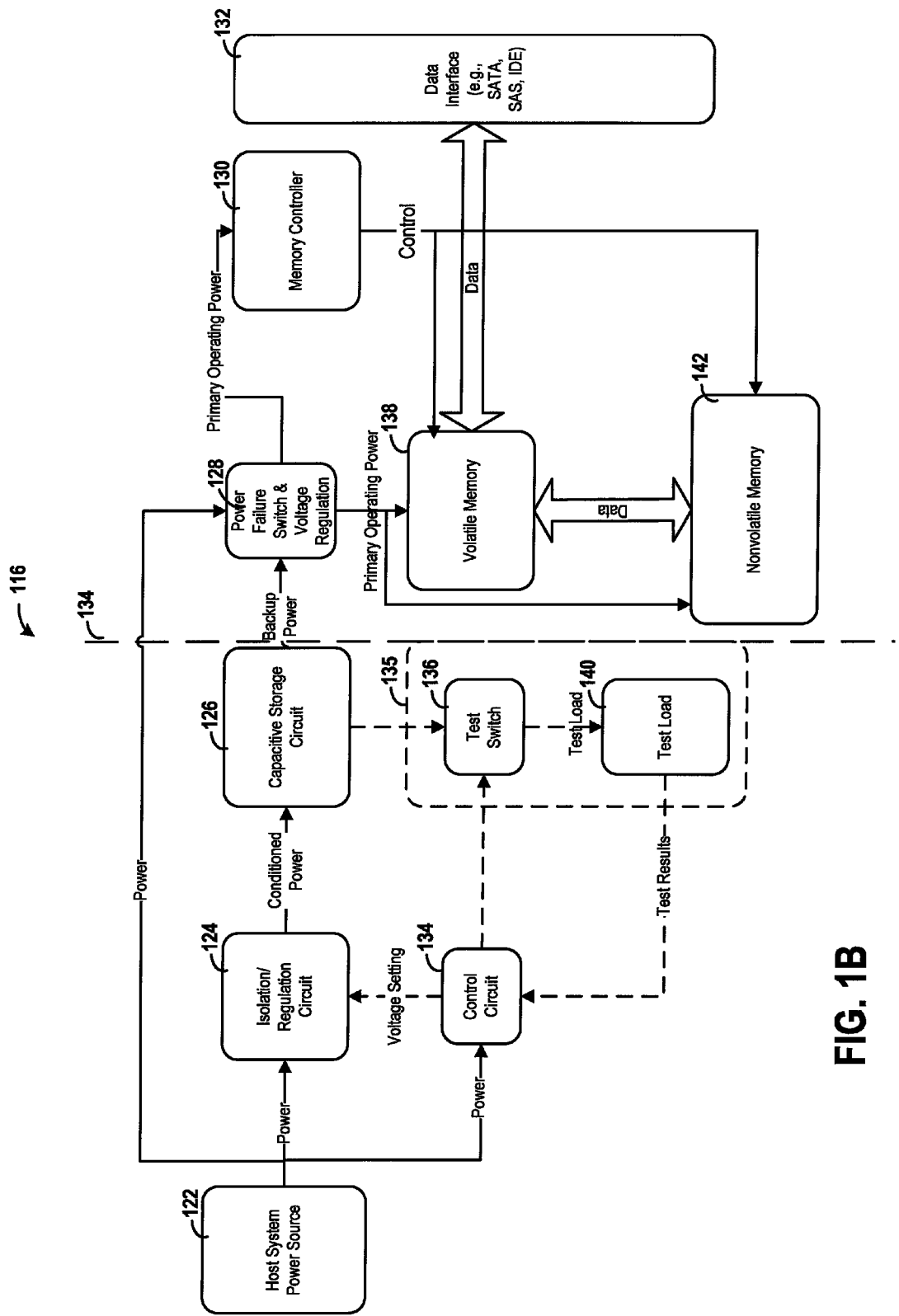
FIG. 1B shows a device for regulating backup power to operate memory backup functions in response to a power interruption, according to an example embodiment of the present invention.

FIG. 1B shows a device for regulating backup power to operate memory backup functions in response to a power interruption, according to an example embodiment of the present invention. Host-system power source 122 provides power to the memory/data storage device 116. During normal operation, both memory controller 130 and volatile memory 138 are powered by power from the host-system provided power source 122. Data accesses to both volatile memory 138 and nonvolatile memory 142 are controlled by memory controller 130. Capacitive storage circuit 126 provides backup power in the event of a power failure of the host-system power source 122. Power-failure switch 128 controls whether the primary-operating power is provided from the host-system power source 122 or from the capacitive storage circuit 126.

Isolation regulation circuit 124 provides conditioned power to the capacitive storage circuit 126. In one implementation, isolation regulation circuit 124 conditions the power by increasing or decreasing the voltage to maintain the voltage within a particular range. In other implementations, the isolation regulation circuit 124 sets the voltage to a predetermined voltage level having a margin of error that is relatively small in comparison to the voltage range of the host-system power source 122.

Implementations of the isolation regulation circuit 124 also isolate the capacitive storage circuit 126 from the host-system power source 122 to prevent loading effects due to a drop in the host-system provided power. This helps prevent power loss from the capacitive storage element 126 back to the host-system power source 122. For example, host-system provided power may have an acceptable voltage range of 4.5 V to 5.5 V. A power failure event will therefore not be detected until the voltage drops below 4.5 V. Isolation regulation circuit 124 provides constant isolation from voltage drops such that the power-failure event will not directly reduce the voltage on the capacitive storage circuit 126. Without constant isolation, any delay between detection of a power failure event (e.g., voltage drops below 4.5 V) and activation of an isolation circuit would result in a loss of some of the stored capacitive power flowing back to the host-system power source.

In some implementations, a test circuit 135 can be used to actively test the capacitive storage circuit 126. This test can be implemented by discharging part of the stored energy through test load 140 in response to activation of test switch 136. Control circuit 134 can monitor the discharge capabilities of the capacitive storage circuit 126. Using the monitored test results, control circuit 134 can determine a desired voltage setting and generate a control signal that is sent to isolation regulation circuit 124. Isolation regulation circuit 124 responds to the control signal by setting the charge voltage of the capacitive storage circuit to a desired level. One implementation of the testing circuit 135 is to use the circuit to perform a one-time test performed during initialization or manufacturing of the data storage device. Another implementation allows for testing throughout the use of the device to provide adaptive control as the capacitor degrades. Thus, the testing circuit can be particularly useful for supercapacitors, which have both a wide range of capacitance values and are subject to degradation over time. For further details on such testing circuits and related methods, reference can be made to U.S. application Ser. No. 12/206,968, entitled "HYBRID DATA STORAGE SYSTEM WITH SELF-TEST CAPABILITY," and filed Sep. 9, 2008, which is fully incorporated herein by reference.

The memory device 116 can interface with a computer using a number of different data interfaces 132 including, but not limited to, SATA, FCAL, SAS, and Integrated Drive Electronics (IDE). In addition to functioning as a single drive within a computer system, an array of disks can be implemented within the system. Such an array could be configured according to various configurations defined by redundant array of independent disc (RAID) standards. The presence of multiple drives within the same computer system allows for the energy storage circuit 126 and the isolation regulation circuit 124 to be shared between multiple solid state devices. For instance, the circuits depicted to the left of the dashed line 134 could be shared between multiple sets of the circuits depicted to right of the dashed line 134. In a particular implementation, the control signal for the voltage setting can be modified as a function of the number of drives (sets of circuit elements to the right) in the system. As additional drives are added, the voltage level can be increased to compensate for the additional power draw from these circuits during backup procedures. This can be particularly useful for extending the capacitor life expectancy by keeping the voltage lower than would be necessary to support the maximum number of drives for the system.

Figure 2:
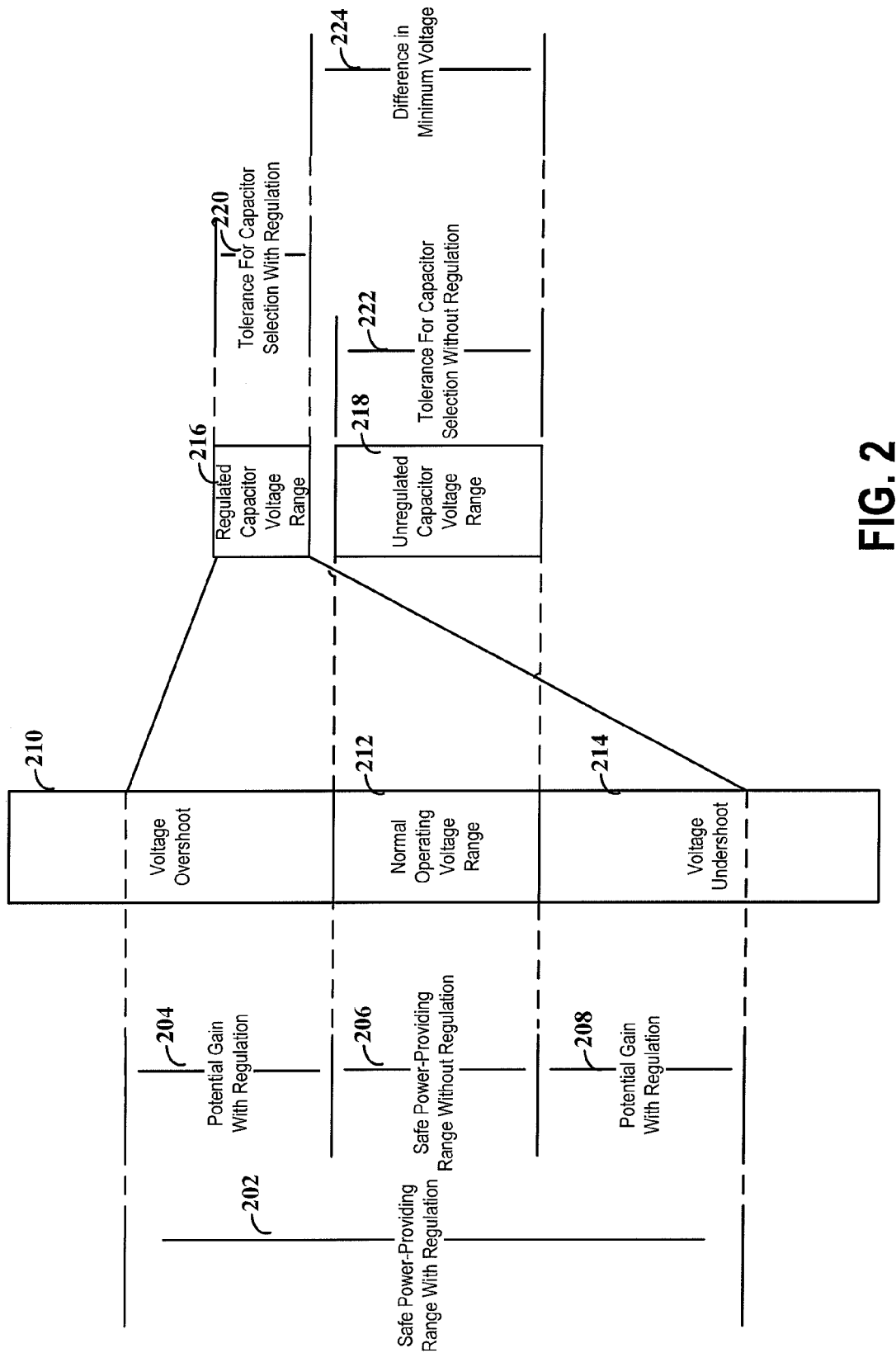
FIG. 2 shows a graph of operating voltage and power ranges for regulated and unregulated backup power supplies for memory devices, according to another example embodiment of the present invention.

FIG. 2 shows a graph of operating voltage and power ranges for regulated and unregulated backup power supplies of solid-state memory devices, according to another example embodiment of the present invention. The vertical bar represents potential voltages from the host-system provided power. Normal operating range 212 represents voltage within the normal operating range of the host-system provided power, for example as specified per a certain storage device standard. Undershoot range 214 represents voltages that are less than the normal operating range. Absent a backup-supply, voltages that are lower than this value could result in loss of data stored in volatile memory circuits. Overshoot range 210 represents voltages that exceed the normal operating range and that could potentially damage the memory device including, for example, a supercapacitor used for power-backup purposes.

Range 206 shows the safe power-providing range without implementation of an isolation regulation circuit. Unregulated capacitor voltage range 218 represents the possible voltage ranges for which a backup capacitor, directly attached to the unregulated power, might be designed. In particular, the backup capacitors should be sufficiently large so as to accommodate voltages as low as the minimum voltage that is still within the normal operating voltage range 212. The capacitor(s) should also be rated to handle voltages as high as the maximum voltage of the normal operating voltage range 212. This capacitor specification is shown by the tolerance range 222.

Regulated capacitor voltage range 216 represents an example voltage range of the capacitor that results from the conditioning of power from the host-system power source using an isolation regulation circuit. The tolerance for the capacitor 220 can be significantly less than that of the unregulated tolerance 222. Moreover, the minimal voltage for the regulated range 216 can be set higher than the minimum voltage range of the unregulated range 218. This difference in minimum voltages is represented by the range 224. As discussed herein, raising the minimum voltage increases the minimum energy per capacitance of the system. For instance, taking the equation $E=\frac{1}{2}CV^2$ and setting V=to the minimum values respectively results in an increased energy on the order of $E_{increase}=\frac{1}{2}C(V^2_{regulated\ min} - V^2_{unregulated\ min})$.

Safe power-providing range 202 represents the range of power supply voltages for which the regulated capacitor voltage range 216 can be maintained. Thus, potential gains 204 and 208 represent power supply voltage ranges for which the charting of the capacitor can be maintained using power from the host-system power source. Thus, even when voltage of the power source drops below the normal operating voltage range 212, power from the host-system power source is still available to the capacitor within the regulated capacitor voltage range 216.

The particular ranges and settings are merely examples and could be changed as desired. For instance, the regulated capacitor voltage could partially or completely overlap the unregulated capacitor voltage range. In implementations using a low dropout linear regulator, the minimum voltage for the regulated range 216 would be slightly higher than the minimum voltage for the unregulated range 218. Nevertheless, the regulated capacitor voltage range would be significantly smaller due to the ability to maintain a more tightly controlled voltage range. This can be particularly useful for increasing capacitor life expectancy by keeping the charge voltage low. Another potential benefit of improved voltage regulation is improved capacitor failure prediction due to better knowledge of the charge voltage stored on the capacitor.

Figure 3:
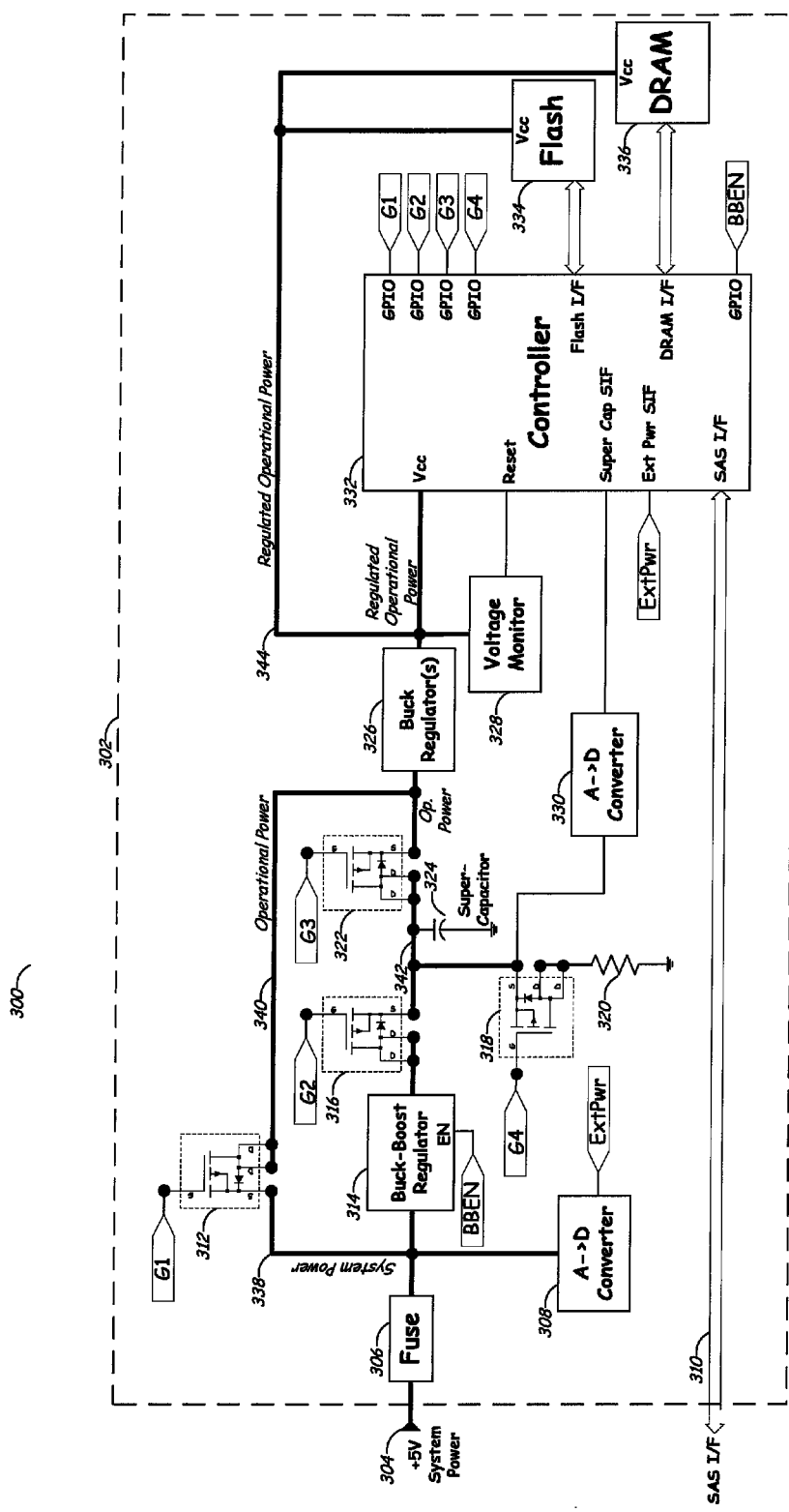
FIG. 3 shows a regulation and isolation circuit for providing backup power to a memory circuit, according to another example embodiment of the present invention.

FIG. 3 shows a system diagram of a data storage device 302. System power is received at input/connection 304, and commands and data are communicated from a host system through SAS interface 310. In one non-limiting implementation, the host system can be a computer system, such as what is shown in FIG. 1.

The device contains a fuse for safety purposes, shown at 306. The fused system power 338 is connected to an Analog to Digital Converter (ADC) 308 for determining the voltage level of system power. The determined voltage level is provided to controller 332. Controller 332 monitors the voltage level to detect insufficient system power 338. In response to detecting insufficient system power, the controller 332 can enable the use of supercapacitor 324 by turning on switch 322 and turning off switch 312. In one implementation, switch 316 remains enabled during such a switch-over to allow buck-boost regulator 314 to harvest remaining system power 338. Switch 316 can then be turned off (and/or regulator 314 can be disabled) once the detected voltage from ADC 308 indicates that there is little remaining system power 338.

The buck-boost regulator 314 receives system power at 338 and provides a voltage level 342 that is particularly well-suited for supercapacitor 324. Moreover, buck-boost regulator 314 is shown as providing dedicated power to the supercapacitor 324. This can be particularly useful for providing a desired charging voltage 342 for the supercapacitor 324 that can be different from that of the voltage level of fused system power 338.

The device contains four MOSFETs (312, 316, 318 and 322) that operate as switches used in the testing of supercapacitor 324. Although p-channel enhancement-mode MOSFETs are shown for MOSFETs 312, 316, 318, and 322, other designs are possible. For instance one or more of the FETs could be n-channel or depletion-mode. These FETs can be eliminated in designs that do not intend to test supercapacitor 324.

The states of the MOSFETs are controlled using output signals from the controller 332. FIG. 3 shows the outputs as general purpose input/output (GPIO) pins G1-G4 from the controller 332. Controller 332 can, however, be implemented using a microcontroller having a processor, discrete logic, programmable logic arrays or combinations thereof. For instance, although the design shows that the controller 332 directly drives the gates of the MOSFETs, a FET gate driver IC can be used to drive the gate voltage(s).

At boot-up and in normal operation, MOSFET 312 and 318 are off (non-conducting), and 316 and 322 are on (conducting). During supercapacitor testing, MOSFETs 312 and 318 are turned on, and 316 and 322 are turned off. This essentially disconnects supercapacitor 324 from the system and applies a known load to it, shown as resistor 320. The ADC at 330 is used to measure the voltage of supercapacitor 324 as it discharges, and this information is used to determine the health of supercapacitor 324. The controller 332 can use the health measurement to make decisions based upon the health of the supercapacitor. In some implementations, this testing can be limited to times when the data storage device 302 is idle or has flushed data-integrity-critical data from the volatile memory to the nonvolatile memory. Testing can also be implemented during actual device operation; however, testing can partially (or completely) drain charge stored on the supercapacitor. Accordingly, additional design margin may be required to compensate this charge loss to ensure the supercapacitor can still deliver sufficient energy in the event of the loss of host-system provided power immediately following (or during) testing. For further details, reference can be made to the previously identified U.S. application Ser. No. 12/206,968, which is fully incorporated herein by reference.

Operational power at voltage rail 340 is delivered to one or more buck regulators at 326 for generating the voltages 344 for power used by controller 332, nonvolatile memory 334, and volatile memory (DRAM in this instance) 336. The regulated operational voltage is monitored by a voltage monitor 328 and is used to generate a reset into controller 332. The controller 332 includes a microprocessor, a SAS interface 310, a nonvolatile memory (NAND flash in this instance) interface to communicate with one or more NAND flash chips 334, and volatile memory interface to communicate with volatile memory, in this case one or more DRAM chips 336.

The capacitive circuits and related circuitry as described herein can be implemented in a variety of manners, including those discussed above. The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include variations of the type of backup power source, variations in threshold voltage settings, variations in test application and implementation, and variations in the number and type of circuits that are being powered under backup. Other changes involve using control circuits arranged differently than those shown yet carrying out functions as described in accordance with one or more example embodiments. Such modifications and changes do not depart from the true spirit and scope of the present invention, which is set forth in the following claims.

What is claimed is:

1. A data-storage device comprising:
   a memory control circuit;
   a solid-state non volatile memory circuit for providing, under control of the memory control circuit, storage of data;
   a volatile memory circuit having a primary-operating power and for storing, under control of the memory control circuit, write data destined for the solid-state nonvolatile memory circuit;

power circuitry for receiving electrical power from an external host-system power source and for providing the received electrical power for use as the primary-operating power; and a backup power circuit including an energy-storage circuit with one or more energy storage components designed to hold sufficient energy to provide substantially all of the primary-operating power during a minimum time period sufficient to permit data transfer, of at least dirty write data, from the volatile memory circuit to the nonvolatile memory circuit, and an isolation-regulation circuit for providing voltage regulation of the electrical power received from the host-system power source, for providing the regulated voltage for charging of the energy storage circuit, and for isolating the host-system power source from the energy storage components in response to the power received from host-system power source dropping below a voltage threshold level.

2. The data storage device of claim 1 wherein the one or more energy storage components include one or more supercapacitors.

3. The data storage device of claim 2, further including a configuration circuit for determining a charging voltage level for charging the supercapacitor and wherein the isolation-regulation circuit is configured to provide the voltage regulation as a function of the determined charging voltage level.

4. The data storage device of claim 1, wherein the isolation-regulation circuit includes a buck-boost regulator that is configured to deliver a regulated voltage that is higher than a voltage of the power received from host-system power source.

5. The data storage device of claim 1, wherein the isolation-regulation circuit includes a buck regulator that can be configured to deliver a regulated voltage that is lower than a voltage of the power received from host-system power source.

6. The data storage device of claim 1, further including a power control circuit for generating a control signal as a function of detected power-providing capabilities of the energy storage circuit and wherein the isolation-regulation circuit includes a buck-boost regulator that controls a voltage level applied to the energy storage components in response to the control signal.

7. The data storage device of claim 1, wherein the isolation-regulation circuit is configured and arranged to control a charging voltage of the energy storage components substantially independent of a voltage of the power received from the host-system.

8. The data storage device of claim 1, wherein the isolation-regulation circuit includes a voltage regulator configured and arranged and to generate, from the received host-system power, a voltage, for charging a capacitor, that is substantially independent of a voltage of the primary-operating power.

9. The data storage device of claim 1, further including a housing structure for containing the circuits within a hard-disc form factor corresponding to one of: 5.75 inch×1.63 inch×8 inch; 4 inch×1 inch×5.75 inch; 0.59 inch×2.8 inch× 3.9 inch, and 0.28 inch×2.8 inch×3.9 inch.

10. A data storage device comprising:
a hard-disc housing structure containing,
a power supply input for providing operating power;
a memory control circuit;
a nonvolatile, solid-state memory circuit for providing memory access, under control of the memory control circuit, to data;

a caching memory circuit having a primary-operating power input and for storing a cached version of the data, the caching memory circuit subject to loss of the cached version of the data in response to a voltage at a primary-operating power input dropping below a voltage threshold level;

an operating power circuit for carrying power the power supply input to the primary-operating power input of the caching memory circuit; and a backup power circuit including a power-reservoir circuit, including a capacitor, designed to hold a peak charge sufficient to provide substantially all power the primary-operating power input during a minimum time period sufficient to permit transfer of at least dirty data from the caching memory circuit to the nonvolatile memory circuit, and a buck-boost regulator circuit for providing voltage regulation of power from the power supply input, for blocking power from flowing to the power supply input from the capacitor when the primary-operating power drops below the voltage threshold level and for dedicating use of the regulated power to the power-reservoir circuit.

11. The data storage device of claim 10, wherein the data storage device is designed to receive, on the power supply input, voltages within an operational voltage range that has a minimum voltage level and wherein the buck-boost regulator circuit is configured to regulate the power to a voltage higher than the minimum voltage level.

12. The data storage device of claim 10, wherein the data storage device is designed to receive, on the power supply input, voltages within an operational voltage range that has a maximum voltage level and wherein the buck-boost regulator circuit is configured to regulate the power to a voltage lower than the maximum voltage level.

13. The data storage device of claim 10, further including a test circuit for determining power providing capabilities of the capacitor and for generating a control signal in response to the determination and wherein the buck-boost regulator circuit is configured to adjust a voltage level of the regulated power in response to the control signal.

14. The data storage device of claim 10, wherein the hard-disc housing structure includes an interface for one of a Serial Advanced Technology Attachment (SATA), Advanced Technology Attachment (ATA), Fibre-Channel-Arbitrated-Loop (FCAL), IEEE-1394, Universal Serial Bus (USB), Serial Attached SCSI (SAS), and Parallel Small Computer System Interface (SCSI).

15. A method of using a data storage device, the method comprising:

providing access to data stored within a nonvolatile solid-state memory circuit under control of a memory control circuit;

caching data within a volatile memory circuit to facilitate the operation of the data storage device including access to the solid-state memory circuit;

delivering power received from a host-system power supply to the volatile memory circuit for use as primary-operating power;

storing, in one or more energy-storage components within an energy-storage circuit, an amount of energy sufficient to provide substantially all of the primary-operating power to the volatile memory circuit during a minimum time period sufficient to permit transfer of at least dirty data from the volatile memory circuit to the nonvolatile memory circuit;

regulating, using an isolation-regulation circuit, the power received from the host-system power supply;

isolating, using an isolation-regulation circuit, the power received from the host-system power source relative to the energy-storage circuitry in response to the host-system provided power dropping below a voltage threshold level; and charging the energy-storage component using the regulated and isolated power from the isolation-regulation circuit.

16. The method of claim 15, wherein the step of regulating includes maintaining the regulated power within a voltage range.

17. The method of claim 15, wherein the step of regulating includes boosting a voltage level of the power from the host-system power supply.

18. The method of claim 15, further including the steps of testing the power providing capabilities of the energy-storage component, determining a value for the power providing capabilities as a function of the test and setting a voltage level for the regulated power to the energy-storage component as a function of the determined value.

* * * * *